United States Patent
Dieckmann

(10) Patent No.: US 10,899,331 B2
(45) Date of Patent: Jan. 26, 2021

(54) HYDRAULIC ACTUATOR, VEHICLE AXLE ARRANGEMENT COMPRISING A HYDRAULIC ACTUATOR, AND ELECTRONICALLY CONTROLLABLE HYDRAULIC BRAKE SYSTEM

(71) Applicant: WABCO GmbH, Hannover (DE)

(72) Inventor: Thomas Dieckmann, Pattensen (DE)

(73) Assignee: WABCO GMBH, Hannover (DE)

( * ) Notice: Subject to any disclaimer, the term of this patent is extended or adjusted under 35 U.S.C. 154(b) by 232 days.

(21) Appl. No.: 16/032,090

(22) Filed: Jul. 11, 2018

(65) Prior Publication Data

US 2019/0016322 A1    Jan. 17, 2019

(30) Foreign Application Priority Data

Jul. 13, 2017 (DE) .................. 10 2017 006 636

(51) Int. Cl.
*B60T 13/66* (2006.01)
*B60T 8/171* (2006.01)
*B60T 8/58* (2006.01)
*B60T 13/14* (2006.01)
*B60T 13/74* (2006.01)
(Continued)

(52) U.S. Cl.
CPC ............ *B60T 13/662* (2013.01); *B60T 7/042* (2013.01); *B60T 8/171* (2013.01); *B60T 8/326* (2013.01);
(Continued)

(58) Field of Classification Search
CPC .... B60T 13/662; B60T 13/142; B60T 13/143; B60T 13/148; B60T 13/686; B60T 13/745; B60T 7/042; B60T 8/171; B60T 8/326; B60T 8/58; B60T 8/4266; B60T 8/4863; B60T 2250/04; B60T 2270/14
(Continued)

(56) References Cited

U.S. PATENT DOCUMENTS 8,818,671 B2 * 8/2014 Morishita ............... B60T 7/042
701/70
9,616,864 B2 * 4/2017 Baehrle-Miller ..... B60T 13/741
(Continued)

FOREIGN PATENT DOCUMENTS

DE      102014205645 A1    10/2014
DE      102014221901 A1     4/2016

*Primary Examiner* — Tuan C To
(74) *Attorney, Agent, or Firm* — Leydig, Voit & Mayer, Ltd.

(57) ABSTRACT

A hydraulic actuator for supplying a hydraulic brake pressure to service brakes of a vehicle includes an actuator cylinder including a piston. A hydraulic working pressure of a brake fluid can be set in accordance with a position of the piston. The brake fluid is supplied from a hydraulic reservoir assigned to the hydraulic cylinder, and the hydraulic working pressure prevails in a working space of the actuator cylinder and can be output via an actuator output port on the actuator cylinder in order to supply a hydraulic brake pressure in accordance with the hydraulic working pressure. The hydraulic actuator further includes an electrically controllable motor. A rotary motion brought about by the electrically controllable motor can be converted by a conversion mechanism into a translational motion of the piston parallel to a longitudinal direction thus enabling a hydraulic brake pressure to be supplied by electric control of the motor.

20 Claims, 2 Drawing Sheets

(51) Int. Cl.
  *B60T 8/32* (2006.01)
  *B60T 13/68* (2006.01)
  *B60T 7/04* (2006.01)
  *B60T 8/42* (2006.01)
  *B60T 8/48* (2006.01)

(52) U.S. Cl.
  CPC .............. *B60T 8/58* (2013.01); *B60T 13/142* (2013.01); *B60T 13/143* (2013.01); *B60T 13/148* (2013.01); *B60T 13/686* (2013.01); *B60T 13/745* (2013.01); *B60T 8/4266* (2013.01); *B60T 8/4863* (2013.01); *B60T 2250/04* (2013.01); *B60T 2270/14* (2013.01)

(58) Field of Classification Search
  USPC ........................................................... 701/70
  See application file for complete search history.

(56) References Cited

U.S. PATENT DOCUMENTS

| | | | |
|---|---|---|---|
| 9,731,693 B2* | 8/2017 | Sakashita | B60T 13/662 |
| 9,789,857 B2* | 10/2017 | Kim | B60T 7/22 |
| 10,363,912 B2* | 7/2019 | Crossman | B60T 8/50 |
| 10,449,938 B2* | 10/2019 | Knechtges | B60T 8/4086 |
| 2013/0207452 A1* | 8/2013 | Gilles | B60T 8/4018 |
| | | | 303/9.75 |
| 2014/0131154 A1* | 5/2014 | Ganzel | B60T 13/686 |
| | | | 188/355 |
| 2014/0217809 A1* | 8/2014 | Koyama | B60T 17/22 |
| | | | 303/6.01 |
| 2014/0319902 A1 | 10/2014 | Benzler et al. | |
| 2015/0197229 A1* | 7/2015 | Knechtges | B60T 13/686 |
| | | | 303/3 |
| 2015/0239441 A1* | 8/2015 | Klostermann | B60T 15/028 |
| | | | 303/7 |
| 2016/0114779 A1 | 4/2016 | Binder et al. | |
| 2016/0200307 A1* | 7/2016 | Feigel | B60T 7/12 |
| | | | 303/6.01 |
| 2016/0207512 A1* | 7/2016 | Komaba | B60T 13/662 |
| 2016/0297413 A1* | 10/2016 | Alford | B60T 8/4081 |
| 2016/0339888 A1* | 11/2016 | Yokoyama | F16D 65/18 |
| 2017/0015290 A1* | 1/2017 | Oosawa | B60T 13/146 |
| 2017/0015293 A1* | 1/2017 | Yagashira | B60T 8/4081 |
| 2018/0162340 A1* | 6/2018 | Irwan | B60T 13/66 |

* cited by examiner

HYDRAULIC ACTUATOR, VEHICLE AXLE ARRANGEMENT COMPRISING A HYDRAULIC ACTUATOR, AND ELECTRONICALLY CONTROLLABLE HYDRAULIC BRAKE SYSTEM

CROSS REFERENCE TO RELATED APPLICATIONS

This application claims benefit to German Patent Application No. DE 10 2017 006 636.1, filed Jul. 13, 2017, which is incorporated by reference herein.

FIELD

The invention relates to a hydraulic actuator, to a vehicle axle arrangement comprising a hydraulic actuator, and to an electronically controllable hydraulic brake system for a vehicle, in particular a commercial vehicle.

BACKGROUND

Conventional brake systems in vehicles, especially commercial vehicles, can have one pneumatic brake circuit carrying compressed air or one hydraulic brake circuit carrying brake fluid for each vehicle axle, via which circuit a braking input detected by an actuating device, e.g. a brake pedal having a braking value transmitter, can be directly implemented by the production in the respective brake circuit of a pneumatic or hydraulic brake pressure corresponding to the braking input and the outputting of said brake pressure to service brakes of the brake system.

In a pneumatically operated brake system, it is furthermore also possible to provide electropneumatic control of the service brakes if the braking input is initially electrically detected by the braking value transmitter and a corresponding brake pressure is then set under electric control. This is accomplished, for example, by means of a pressure modulator or axle modulator arranged at the respective vehicle axles, which can, in particular, be electrically controlled in order to produce a certain pneumatic brake pressure using compressed air from a pressure medium reservoir. In an embodiment of this kind, the purely pneumatic channel, which likewise runs via the axle modulator, is resorted to only if the electronic control system fails.

In (electro)pneumatically or hydraulically operated brake systems of this kind, corresponding brake lines carrying the compressed air are laid through the vehicle, wherein a control pressure is initially produced, emanating from the actuating device, i.e. from a central point, and, depending on the embodiment of the brake system, this is then converted at the respective vehicle axle into the brake pressure which is output to brake cylinders of the service brakes in order to achieve the desired braking effect on the vehicle, i.e. a setpoint vehicle deceleration.

The disadvantage with these brake systems is therefore that, at least for purely pneumatic or hydraulic control, the brake lines carrying the compressed air or brake fluid run through the entire vehicle from a central point in order to feed a brake pressure to the service brakes at the individual vehicle axles. Moreover, central pressure medium reservoirs are provided, which supply the corresponding pressure medium to the vehicle axles. Thus, the respective pressure medium has to be transferred via a multiplicity of brake lines, which is expensive and also fault-prone.

To avoid this, brake systems operated in a purely electric manner, which manage without compressed air or without a brake fluid and in which reliance is placed on brake-by-wire control, in which the service brakes are actuated electromechanically, e.g. by means of a motor that is arranged at the service brakes and is controlled in accordance with a control signal by means of a motor control unit, are also contemplated.

The disadvantage with these brake systems actuated in a purely electric manner is that an electrically controlled mechanical actuator has to be provided at each wheel of the vehicle and this has to be of robust design owing to its arrangement close to the wheel since high mechanical loads and heat generation can occur at the wheel during driving. However, this is very expensive.

In connection with pneumatic and hydraulic brake systems, there is furthermore a known brake booster which is shown by way of example for a hydraulic brake system in DE 10 2014 221 901 A1 or DE 10 2014 205 645 A1. According to these documents, a brake pedal, via which a manual braking input can be made by the driver, is provided as the central actuating device. Depending on the braking input, mechanical movement of a piston in a cylinder is used to produce a hydraulic brake pressure, which is fed to the hydraulically actuable service brakes via brake lines. By means of additional hydraulic units, which have an inlet valve/outlet valve combination with a return pump and a temporary reservoir, it is possible, when necessary, to achieve electrically controlled pressure maintenance or pressure reduction by pumped discharge of the hydraulic fluid into the temporary reservoir. By this means, it is possible, as a supplement or addition to the manual braking input, also to implement an automated braking input under electric control, e.g. as part of an ESP functionality and/or an ABS functionality in the vehicle.

SUMMARY

In an embodiment, the present invention provides a hydraulic actuator for supplying a hydraulic brake pressure to service brakes of a vehicle. The hydraulic actuator includes an actuator cylinder including a piston. A hydraulic working pressure of a brake fluid can be set in accordance with a position of the piston. The brake fluid is supplied from a hydraulic reservoir assigned to the hydraulic cylinder, and the hydraulic working pressure prevails in a working space of the actuator cylinder and can be output via an actuator output port on the actuator cylinder in order to supply a hydraulic brake pressure in accordance with the hydraulic working pressure. The hydraulic actuator further includes an electrically controllable motor. A rotary motion brought about by the electrically controllable motor can be converted by a conversion mechanism into a translational motion of the piston parallel to a longitudinal direction thus enabling a hydraulic brake pressure to be supplied by electric control of the motor. The translational motion of the piston in the actuator cylinder of the hydraulic actuator can be brought about solely on the basis of electric control of the motor. The hydraulic actuator is configured to be arranged and operated at a vehicle axle of the vehicle to which the service brakes to be supplied with hydraulic brake pressure are assigned.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
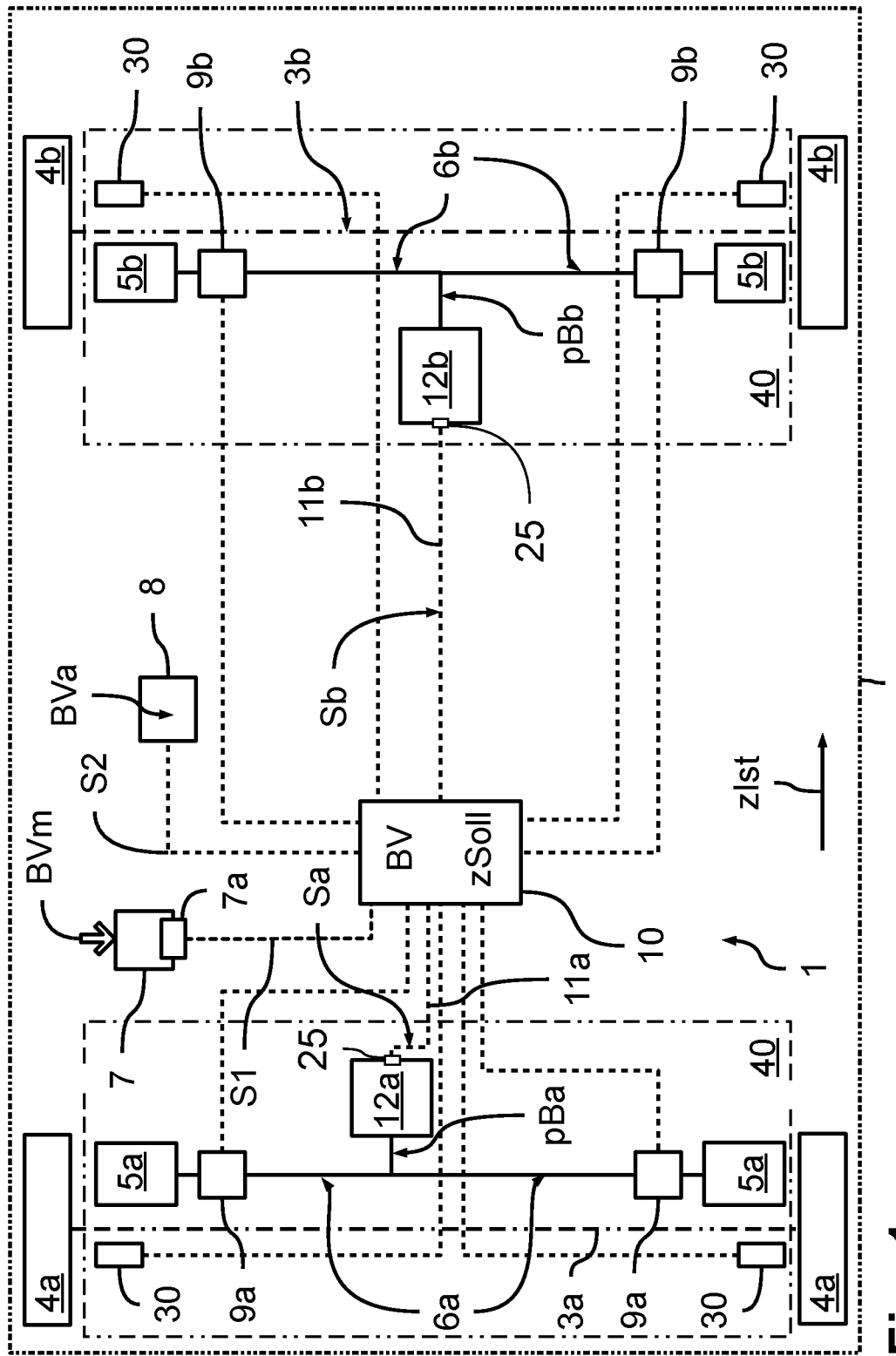
FIG. 1 shows a brake system with hydraulic actuators assigned to each axle.

By way of an actuating device, which interacts with a brake booster, a hydraulic brake pressure can be provided as follows: when the brake pedal is actuated by the driver, an input rod interacting with the brake pedal is pressed against an output rod, the movement of which is transmitted directly to the longitudinally movable piston in the cylinder. Acting against the output rod during this process is a return force of a spring and a pressure force produced by a working pressure in the cylinder. Both forces counteract a driver braking force exerted by the driver on the brake pedal during manual actuation by said driver.

During an actuation of the brake pedal, a change in volume in a working space of the cylinder is brought about via the rods and the piston, as a result of which the working pressure in the cylinder changes. Depending on the working pressure, the hydraulic brake pressure is output to the respective service brake via brake lines and the additional hydraulic units. In addition to a movement of the output rod and of the piston via the input rod, the rod and the piston can also be moved by means of a booster element of the brake booster, thus assisting or facilitating the actuation of the brake pedal by the driver since the movement brought about by the booster element with a booster force acts in the same direction as the driver braking force, which can thereby be adapted in order, in particular, to set a particular brake feel. Here, the booster element can be moved by means of a motor in accordance with the electronically detected position of the brake pedal.

Embodiments of the invention provide hydraulic actuators by way of which hydraulic actuation of service brakes is made possible in a simple and reliable manner. Embodiments of the invention additionally provide vehicle axle arrangements comprising a hydraulic actuator and electronically controllable hydraulic brake systems, by way of which hydraulic actuation of service brakes in a vehicle is made possible in a simple and reliable manner.

According to embodiments of the invention, purely electrically controllable hydraulic actuators are provided, which, by means of a conversion mechanism, convert a rotary motion of a motor into a translational motion of a piston in an actuator cylinder in order to set a hydraulic working pressure in a working space of the actuator cylinder, in accordance with which, in turn, a hydraulic brake pressure can be output at service brakes at a vehicle axle of a vehicle. The purely electrically controllable hydraulic actuators are designed in such a way that they can be arranged directly at the vehicle axle at which the service brakes to which the hydraulic brake pressure is to be fed are also arranged.

Through the use of hydraulic actuators according to embodiments of the invention, hydraulic brake lines carrying a brake fluid in the vehicle can be reduced since, in contrast to a conventional hydraulic brake system, there is no need to lay brake lines or control lines from a central point, e.g. starting from an actuating device, to the vehicle axles. As a result, it is possible, on the one hand, to reduce costs but, on the other hand, it is also possible to increase reliability since leaks in the hydraulic brake lines at critical points in the vehicle, which are exposed to continuous movement and thus to high loads during driving, can be avoided. This is because only brake lines directly at the respective vehicle axle, i.e. between the hydraulic actuator and the respective service brake to which a hydraulic brake pressure is to be fed by the hydraulic actuator, are required for the operation of the hydraulic actuators according to embodiments of the invention in a brake system, as a result of which high loads on the hydraulic brake lines are minimized.

According to an embodiment of the invention, hydraulic actuators are provided in which a motor of the hydraulic actuator is controlled in accordance with electric control by means of a control signal, wherein a rotary motion brought about by the motor can be converted by means of a conversion mechanism into a translational motion of a piston parallel to a longitudinal direction. Here, the piston is arranged in a longitudinally movable manner in an actuator cylinder, wherein a hydraulic working pressure prevailing in a working space of the actuator cylinder can be set in accordance with a position of the piston, wherein the hydraulic working pressure can be output via an actuator output port on the actuator cylinder in order to supply a hydraulic brake pressure in accordance with the hydraulic working pressure. Here, the brake fluid in the actuator cylinder is supplied from a hydraulic reservoir assigned to the hydraulic actuator, which is preferably likewise arranged directly on the hydraulic actuator, thereby enabling the hydraulic lines for transmission to be kept short. Through operation of the hydraulic actuator in accordance with electric control of the motor, it is thus possible in a simple manner to set and output a hydraulic brake pressure directly at the vehicle axle.

Such an arrangement at the vehicle axle on the one hand enables the number or extent of hydraulic brake lines to be reduced but that there is still an actuator at the vehicle axle by means of which a hydraulic brake pressure can be supplied in a simple and reliable manner, and it is therefore also still possible to have recourse to the advantages of a known hydraulic actuation system for the service brakes.

In order to ensure simple construction of the hydraulic actuator at the vehicle axle and a simple way of transmitting a braking input to the hydraulic actuator, just one electric interface for electric control of the hydraulic actuator can be provided in order to set the hydraulic brake pressure which is ultimately output. That is to say that possibly redundant hydraulic or, alternatively, mechanical control of the hydraulic actuator need not be provided so as to make available a hydraulic actuator which is as compact as possible, takes up little installation space and has a low weight.

As compared with a purely electric brake system with brake-by-wire control, the advantage is achieved that the motor system and the electric control system for operating the hydraulic actuator do not have to be designed to be so robust that high mechanical loads and heat generation have to be compensated for during driving since the hydraulic actuator does not necessarily have to be arranged close to a wheel. On the contrary, hydraulic transmission to the service brakes close to the wheels takes place via the brake lines. Thus, mechanical loads close to the wheels can be absorbed by the vehicle axle and, accordingly, do not act directly on the hydraulic actuator, and therefore there is the corresponding possibility of saving costs in the mechanical and thermal design while nevertheless ensuring reliable operation with a long service life.

The electric control of the motor in the hydraulic actuator is preferably accomplished by way of a control signal transmitted electrically to the hydraulic actuator via an actuator control connection, wherein the control signal can be produced for each axle and/or each wheel in accordance with a braking input.

For this purpose, the hydraulic actuator can be assigned to a plurality of—preferably both—service brakes of the respective vehicle axle, thus advantageously enabling axle-specific provision of a hydraulic brake pressure. That is to say it is possible to specify a control signal, in accordance with which the hydraulic actuator can supply a hydraulic brake pressure which can be output at preferably two service brakes of the vehicle axle—left and right, at which the hydraulic actuator is also arranged.

Thus just one hydraulic actuator is required for both service brakes, enabling costs to be reduced since, in particular, just one motor is required. In order also to allow wheel-specific provision of a hydraulic brake pressure, depending on the application, there is alternative provision to assign a hydraulic actuator to each service brake of the wheels of the respective vehicle axle. That is to say that, in this case, two hydraulic actuators are arranged at a vehicle axle having two service brakes, each of the actuators outputting a hydraulic brake pressure which can be output respectively to the service brakes assigned to this vehicle axle.

Thus, according to embodiments of the invention, it is possible to provide a vehicle axle arrangement, e.g. as an assembled unit, which has service brakes, at least one hydraulic actuator—as described above—and hydraulic brake lines connecting the service brakes to the at least one hydraulic actuator in order to transmit the hydraulic brake pressure supplied by the respective hydraulic actuator to the service brakes.

It is thereby advantageously possible to form a compact unit which has the required elements for hydraulic actuation of the service brakes, so that, after the mounting of the vehicle axle arrangement on the vehicle, all that is necessary is to connect an electric actuator line to the actuator control connection of the at least one hydraulic actuator to ensure electric control from the vehicle. Additional laying of hydraulic lines can thus be eliminated.

According to embodiments of the invention, an underlying electronically controllable hydraulic brake system is constructed in such a way that at least one hydraulic actuator is arranged at at least one of the vehicle axles of the vehicle at which hydraulically actuable service brakes are present. Moreover, a central module is provided in the brake system, wherein the central module is designed to produce the control signal in accordance with a braking input and to output it via the actuator line to the at least one hydraulic actuator arranged at the vehicle axle, thus enabling a hydraulic brake pressure to be supplied by the hydraulic actuator in accordance with the control signal, as described above, which brake pressure can be transmitted to at least one service brake at the vehicle axle via at least one hydraulic brake line.

By means of a hydraulic actuator according to an embodiment of the invention, which is arranged directly at the respective vehicle axle, it is accordingly possible in a simple and reliable manner to form an electronically controllable brake system by way of which the braking input can be read in electrically and implemented hydraulically only at the vehicle axle in order then to achieve hydraulic actuation of the service brake(s) of this vehicle axle. By virtue of the abovementioned advantages, it is possible in this case to reduce costs and furthermore ensure reliable operation.

In this case, the braking input can advantageously be a manual braking input, which can be input manually by a driver via an actuating device of the brake system, e.g. a brake pedal. As a supplementary or alternative measure, there can be an automated braking demand, which can be input in an automated way by an assistance control unit of an assistance system interacting with the brake system. By way of a brake system of this kind, it is thus possible to ensure both manual driving operation and automated driving operation, wherein both braking inputs are implemented by means of the hydraulic actuator.

For electronic detection of the manual braking input, the actuating device can have a sensor system, e.g. a displacement sensor and/or a force sensor, which outputs a driver braking request signal in accordance with the actuation by the driver and outputs said signal to the central module, which produces the control signal in accordance therewith.

The central module thus serves as a central control logic unit, which can additionally also perform further control tasks, e.g. stability control (ESP) or slip control (ABS, ASR), by intervening in the service brakes by means of the control signal and/or by means of additional ABS hydraulic units in the hydraulic brake lines between the hydraulic actuator and the service brakes, wherein the ABS hydraulic unit is designed to adapt the hydraulic brake pressure, in particular in accordance with a wheel slip.

FIG. 1 shows an electronically controllable hydraulic brake system 1 of a vehicle 2, in particular a commercial vehicle, having two vehicle axles 3a, 3b, arranged on each of which are two wheels 4a, 4b, wherein each wheel 4a, 4b is assigned a hydraulically actuable service brake 5a, 5b. Accordingly, if a hydraulic brake pressure pBa, pBb is output to the respective service brakes 5a, 5b via hydraulic brake lines 6a, 6b, an actual vehicle deceleration zIst of the vehicle 2 dependent on the brake pressure pBa, pBb can be set via the respective wheel 4a, 4b.

In this case, the electrohydraulic control of the brake system 1 is designed in such a way that a braking input BV, e.g. in the form of a setpoint vehicle deceleration zSoll, is initially transmitted in a purely electric way in the brake system 1 and is then output hydraulically at the respective vehicle axle 3a, 3b by means of a hydraulic fluid or brake fluid. Here, the braking input BV can be a manual braking input BVm, which is input manually by the driver via an actuating device 7, e.g. a brake pedal unit, and/or an automated braking input BVa, which is input in an automated way by an assistance control unit 8 of an assistance system in the vehicle 2.

For this purpose, the actuating device 7 has a sensor system 7a, e.g. a displacement sensor or a force sensor, which detects the manual actuation by the driver and converts it into a driver brake signal S1, which comprises a setpoint vehicle deceleration zSoll characterizing the manual braking input BVm, for example.

The assistance system can be a headway control system, an emergency braking assistant, a rollover prevention device or any other assistance system which is designed to initiate automated braking on the basis of environmental information and/or the current driving situation of the vehicle 2, for example. For this purpose, the assistance control unit 8 outputs an assistance brake signal S2 in accordance with a certain evaluation logic of the corresponding assistance system, said signal comprising a setpoint vehicle deceleration zSoll characterizing the automated braking input BVa.

The driver brake signal S1 and/or the assistance brake signal S2 are transmitted from the actuating device 7 or the assistance control unit 8 to a central module 10 of the electrohydraulic brake system 1 and processed further therein. Here, the central module 10 serves as a central electronic control unit of the electronically controllable hydraulic brake system 1 and can also perform further functions, e.g. stability control (ESP) and/or antilock brake control (ABS) and/or traction control (ASR). After processing the brake signals S1, S2, the central module 10 outputs a control signal Sa, Sb for each axle to hydraulic actuators 12a, 12b at the respective vehicle axle 3a, 3b via a respective actuator line 11a, 11b in accordance with the respectively electrically specified braking input BVm, BVa or with the requested setpoint vehicle deceleration zSoll.

Figure 2:
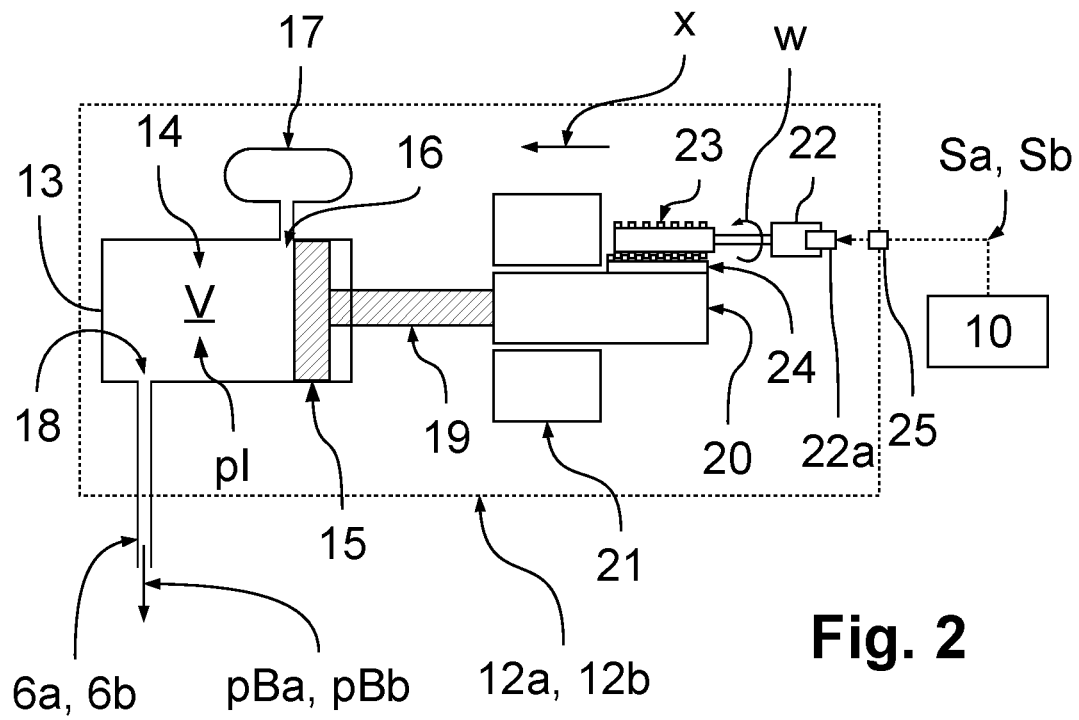
FIG. 2 shows a hydraulic actuator according to FIG. 1 in a detailed view.

A hydraulic actuator 12a, 12b of this kind is illustrated in FIG. 2 by way of example. It has an actuator cylinder 13, in the working space 14 of which there is a hydraulic working pressure pI, which can be set in an infinitely variable manner through the position of a piston 15. Via an actuator supply port 16, hydraulic fluid or the brake fluid can be supplied from a hydraulic reservoir 17 assigned to the respective hydraulic actuator 12a, 12b. Via an actuator output port 18, the hydraulic working pressure pI can be output as a hydraulic brake pressure pBa, pBb to the respective service brake 5a, 5b via the brake lines 6a, 6b.

The hydraulic working pressure pI is adjusted by means of a piston rod 19, which can adjust the piston 15 in an infinitely variable manner, with the result that the working volume V of the working space 14, which is defined by the piston 15, increases or decreases in corresponding fashion to adjust the pressure. The piston rod 19 is operatively connected to an actuator element 20, which is mounted in longitudinally movable fashion in an actuator bearing 21 and, as a result, can be moved parallel to a longitudinal direction x, in which the piston 15 is also moved in the actuator cylinder 13.

Here, the longitudinal movement is accomplished by means of a motor 22, which, in this illustrative embodiment, drives a worm wheel 23, which, in turn, meshes with toothing 24 on the actuator element 20, with the result that a rotary motion w of the motor 22 is converted into a translational motion of the actuator element 20 in the longitudinal direction x. This translational motion is transmitted by the piston rod 19 to the piston 15, thus enabling the ultimately output hydraulic brake pressure pBa, pBb to be set at the corresponding vehicle axle 3a, 3b by means of the motor 22. However, it is also possible to provide any other conversion mechanism for converting the rotary motion of the motor 22 into a translational motion of the piston rod 19 and of the piston 15.

The motor 22 is controlled in accordance with the respective control signal Sa, Sb, which is read in via an actuator control connection 25, thus making it possible to convert the electric braking input BV, BVa, BVm into a hydraulic brake pressure pBa, pBb by means of the hydraulic actuator 12a, 12b. In this case, the motor 22 has a motor control unit 22a for processing the control signals Sa, Sb. Since the hydraulic actuator 12a, 12b is arranged at the respective vehicle axle 3a, 3b, the brake lines 6a, 6b carrying hydraulic fluid have only to be laid to the service brakes 5a, 5b directly at the vehicle axle 3a, 3b. Starting from a central point of the vehicle 2, i.e. from the central module 10 in FIG. 1, all that is then required is to route the electric actuator lines 11a, 11b to the actuator control connections 25 of the hydraulic actuators 12a, 12b in order to be able to transmit the control signal Sa, Sb on said lines. Optionally, redundant transmission of the control signals Sa, Sb via additional lines can also be provided.

Here, the hydraulic actuator 12a, 12b, the corresponding vehicle axle 3a, 3b, the brake lines 6a, 6b and the service brakes 5a, 5b of the respective vehicle axle 3a, 3b form a vehicle axle arrangement 40 which can be delivered in the assembled form such that, after it has been installed on the vehicle 2, all that is required for electrical control is to connect the actuator lines 11a, 11b to the hydraulic actuator 12a, 12b by means of a corresponding interface, e.g. a standardized plug connection, via the actuator control connection 25.

Each of the wheels 4a, 4b of the vehicle 2 can furthermore additionally be assigned an ABS hydraulic unit 9a, 9b, by means of which the hydraulic brake pressure pBa, pBb input by the hydraulic actuators 12a, 12b can be limited or reduced, e.g. in the context of an ABS control operation. For this purpose, the ABS hydraulic unit 9a, 9b has, in particular, an inlet valve/outlet valve combination with a return pump and a temporary reservoir, by means of which pressure maintenance or pressure reduction can be achieved in a known manner by pumped discharge of the hydraulic fluid into the temporary reservoir when required. Here, in accordance with the embodiment shown, the ABS hydraulic unit 9a, 9b is electrically controlled by the central module 10, wherein the central module 10 is supplied in a known manner during this process with the wheel rotation behavior of the individual wheels 4a, 4b, which is determined by wheel speed sensors 30, enabling the central module 10 to infer a case of brake slip and to intervene accordingly by control of the ABS hydraulic unit 9a, 9b. A case of drive slip can also be detected by this means and an appropriate response can be made by building up the brake pressure pBa, pBb at the corresponding wheels 4a, 4b. However, it is also possible in this way for other stability control functions to be performed by the central module 10 by means of the ABS hydraulic units 9a, 9b.

Figure 3:
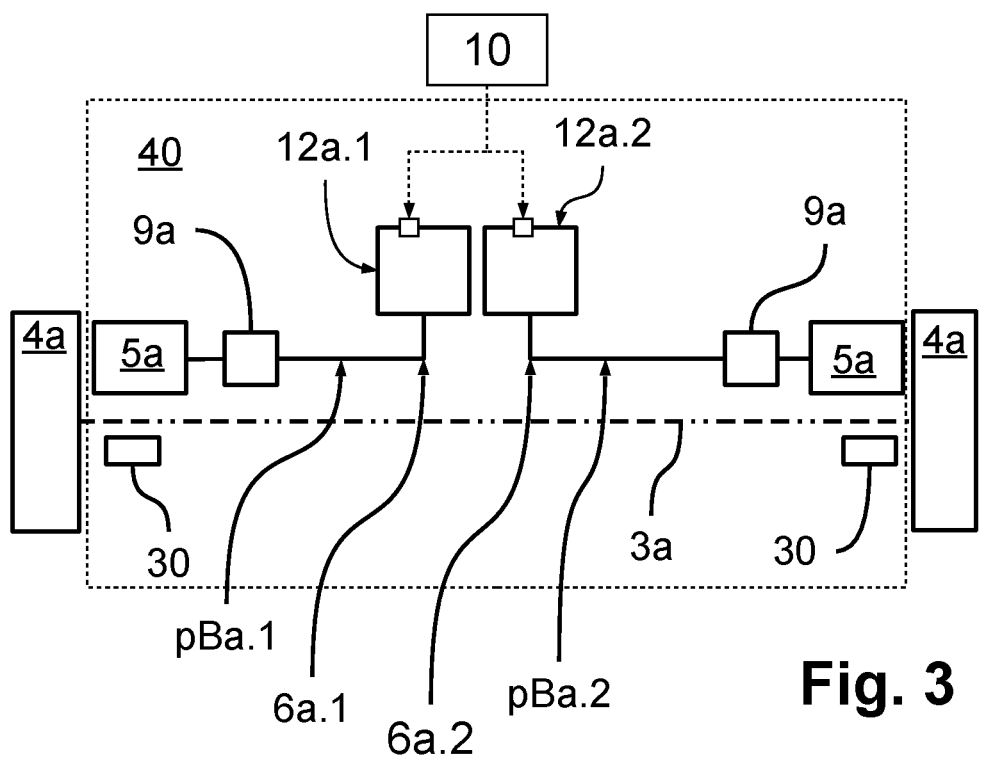
FIG. 3 shows a vehicle axle arrangement with hydraulic actuators assigned to each wheel.

As shown by way of example for the front axle 3a in FIG. 3, it is also possible in the vehicle axle arrangement 40 for each of the wheels 4a to be assigned hydraulic actuators 12a.1, 12a.2 in order to allow wheel-specific input of a hydraulic brake pressure pBa.1, pBb.2. If the hydraulic actuators 12a.1, 12a.2 are arranged close to the wheels in this case, it is furthermore possible to reduce the length of the brake lines 6a.1, 6a.2 further, although it is then necessary to ensure that mechanical loads and loads due to heat generation caused in proximity to the wheels on the hydraulic actuator 12a.1, 12a.2 are avoided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 brake system
2 vehicle
3a, 3b vehicle axles
4a, 4b wheels
5a, 5b service brakes
6a, 6a.1, 6a.2, 6b brake lines
7 actuating device
7a sensor system
8 assistance control unit
9a, 9b ABS hydraulic unit
10 central module
11a, 11b actuator line
12a, 12a.1, 12a.2, 12b hydraulic actuator
13 actuator cylinder
14 working space
15 piston
16 actuator supply port
17 hydraulic reservoir
18 actuator output port
19 piston rod
20 actuator element
21 actuator bearing
22 motor
22a motor control unit
23 worm wheel
24 toothing
25 actuator control connection
30 wheel speed sensors
40 vehicle axle arrangement
BV braking input
BVa automated braking input
BVm manual braking input
pBa, pBa.1, pBa.2, pBb hydraulic brake pressure
pI working pressure
S1 driver brake signal
S2 assistance brake signal
Sa, Sb control signal
V working volume
w rotary motion
x longitudinal direction
zIst actual vehicle deceleration
zSoll setpoint vehicle deceleration

What is claimed is:

1. A vehicle axle arrangement, the vehicle axle arrangement comprising:
   a hydraulic actuator configured to supply a hydraulic brake pressure to at least one service brake, the hydraulic actuator comprising:
   an actuator cylinder including a working space and an actuator output port,
   a piston disposed in the actuator cylinder,
   an electrically controllable motor configured to generate a rotary motion,
   a conversion mechanism configured to convert the rotary motion of the electrically controllable motor into a translational motion of the piston,
   wherein a hydraulic working pressure of a brake fluid in the working space of the actuator cylinder can be set in accordance with a position of the piston,
   wherein the brake fluid is supplied from a hydraulic reservoir assigned to the hydraulic cylinder, and
   wherein the hydraulic working pressure of the brake fluid in the working space of the actuator cylinder can be output via an actuator output port on the actuator cylinder in order to supply a hydraulic brake pressure in accordance with the hydraulic working pressure, and
   at least one hydraulic brake line that connects the hydraulic actuator to the at least one service brake, the at least one hydraulic brake line being configured to transmit the hydraulic brake pressure supplied by the hydraulic actuator to the at least one service brake,
   wherein the hydraulic actuator has an actuator control connection configured to receive a control signal via which the hydraulic actuator can be electrically controlled,
   wherein the translational motion of the piston in the actuator cylinder of the hydraulic actuator can be brought about solely on the basis of the control signal, and
   wherein the hydraulic actuator is configured to be arranged and operated at a respective vehicle axle to which the at least one service brake is assigned.

2. The vehicle axle arrangement as claimed in claim 1, wherein the electrically controllable motor is configured to be controlled by the control signal, wherein the control signal is an axle-specific control signal, generated in accordance with a braking input, transmitted electrically to the hydraulic actuator.

3. The vehicle axle arrangement as claimed in claim 1, wherein:
   the at least one service brake is a plurality of service brakes assigned to the respective vehicle axle and the hydraulic actuator is configured to be assigned to the plurality of service brakes of the respective vehicle axle for an axle-specific provision of the hydraulic brake pressure, or
   the at least one service brake is a single service brake assigned to the respective vehicle axle and the hydraulic actuator is configured to be assigned to the single service brake at one wheel of the respective vehicle axle for a wheel-specific provision of the hydraulic brake pressure.

4. The vehicle axle arrangement as claimed in claim 1, wherein the hydraulic reservoir is assigned only to the hydraulic actuator and is arranged on the hydraulic actuator.

5. The vehicle axle arrangement as claimed in claim 1, wherein the vehicle axle arrangement is preassembled and provided as an assembled unit for installation at the vehicle.

6. The vehicle axle arrangement as claimed in claim 5, wherein the vehicle axle arrangement is configured to be connected to electric actuator lines of the vehicle via a single standardized plug connection.

7. The vehicle axle arrangement as claimed in claim 6, wherein the single standardized plug connection connects the actuator control connection to the electric actuator lines of the vehicle.

8. The vehicle axle arrangement as claimed in claim 5, the vehicle axle arrangement further comprising the respective vehicle axle and the at least one service brake, wherein the assembled unit for installation at the vehicle includes the respective vehicle axle, the at least one service brake, the hydraulic actuator, and the at least one hydraulic brake line.

9. The vehicle axle arrangement as claimed in claim 8, wherein the at least one service brake is a plurality of service brakes assigned to the respective vehicle axle and the hydraulic actuator is assigned to the plurality of service brakes of the respective vehicle axle for an axle-specific provision of the hydraulic brake pressure.

10. The vehicle axle arrangement as claimed in claim 8, wherein the vehicle axle arrangement is not connected, via a hydraulic line connection, to the vehicle.

11. The vehicle axle arrangement as claimed in claim 5, further comprising an ABS hydraulic unit disposed in the at least one hydraulic brake line.

12. The vehicle axle arrangement as claimed in claim 11, wherein the at least one ABS hydraulic unit includes an inlet valve and outlet valve combination with a return pump and a temporary reservoir.

13. The vehicle axle arrangement as claimed in claim 1, wherein the conversion mechanism includes:
   a worm wheel, and
   an actuator element connected to a piston rod of the piston,
   wherein the actuator element includes toothing, and
   wherein the worm wheel is configured to mesh with the toothing of the actuator element to convert the rotatory motion of the electrically controllable motor into the translational motion of the piston.

14. The vehicle axle arrangement as claimed in claim 13, wherein the actuator element is mounted in a longitudinally movable fashion in an actuator bearing.

15. An electronically controllable hydraulic brake system for a vehicle, comprising:
   at least one vehicle axle arrangement as claimed in claim 1, and
   a central module,
   wherein the central module is configured to produce the control signal in accordance with a braking input and to transmit the control signal via actuator lines and an actuator control connection to the at least one hydraulic actuator.

16. The electronically controllable hydraulic brake system as claimed in claim 15, further comprising an actuating device configured to receive a manual input from a driver,
   wherein the braking input is the manual input from the driver and/or an automated braking demand input in an automated way by an assistance control unit of an assistance system connected to the brake system.

17. The electronically controllable hydraulic brake system as claimed in claim 16, wherein the actuating device includes a sensor system configured to detect the manual braking input and to output to the central module as the braking input, a driver braking request signal in accordance with the manual braking input, wherein the sensor system has a displacement sensor and/or a force sensor.

18. The electronically controllable hydraulic brake system as claimed in claim 16, wherein the control signal is transmitted solely by electric transmission, via the actuator lines, to the hydraulic actuator.

19. The electronically controllable hydraulic brake system as claimed in claim 15, further comprising an ABS hydraulic unit arranged in the at least one hydraulic brake line, wherein the ABS hydraulic unit is configured to adapt the hydraulic brake pressure in accordance with a wheel slip.

20. A vehicle comprising an electronically controllable hydraulic brake system as claimed in claim 15.

* * * * *